No. 632,455. Patented Sept. 5, 1899.
A. W. FOSTER.
POWER TRANSMITTING DEVICE.
(Application filed Mar. 9, 1898.)
(No Model.)
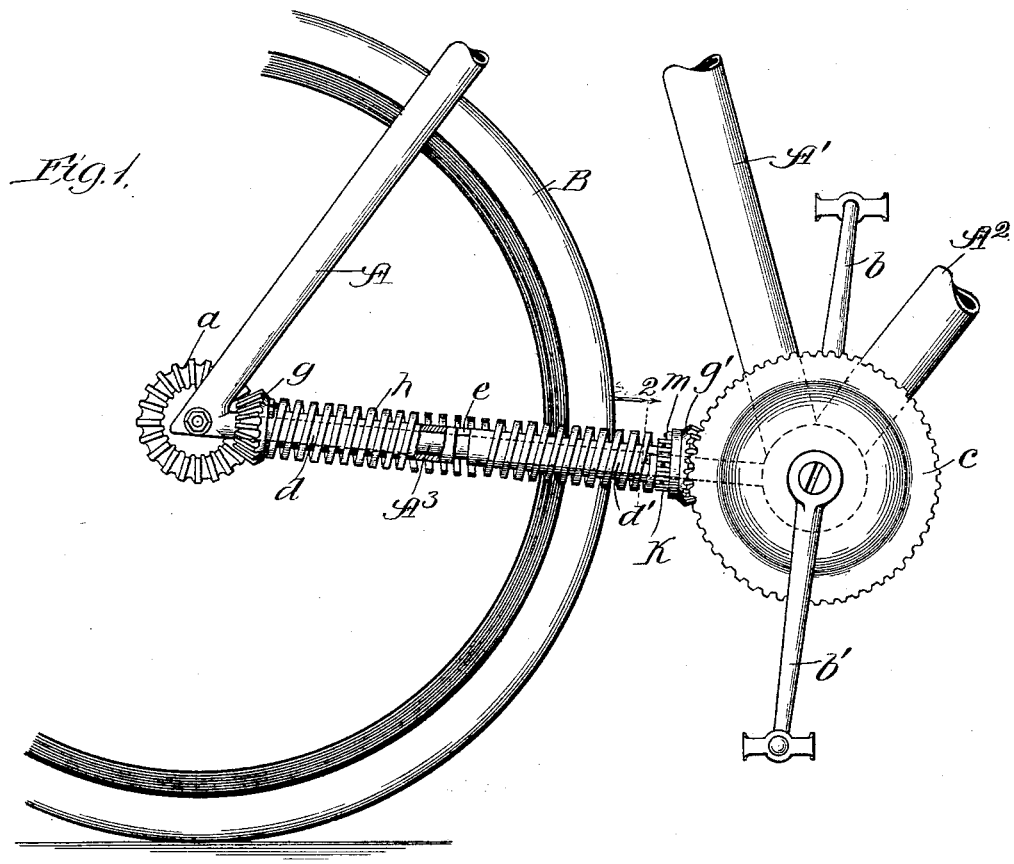
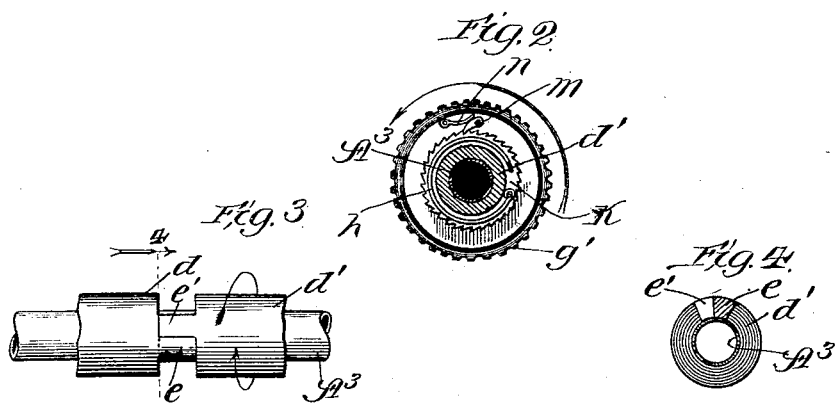
Witnesses:
Chas. E. Gaylord.
Luth L. Peters.
Inventor:
Albert Woolson Foster,
By Joree Bain
Atty.
THE NORRIS PETERS CO., PHOTO-LITHO., WASHINGTON, D. C.

UNITED STATES PATENT OFFICE.

ALBERT WOOLSON FOSTER, OF CHICAGO, ILLINOIS.

POWER-TRANSMITTING DEVICE.

SPECIFICATION forming part of Letters Patent No. 632,455, dated September 5, 1899.

Application filed March 9, 1898. Serial No. 673,177. (No model.)

*To all whom it may concern:*

Be it known that I, ALBERT WOOLSON FOSTER, a citizen of the United States, residing at Chicago, in the county of Cook and State of Illinois, have invented a new and useful Improvement in Power-Transmitting Devices, of which the following is a specification.

My invention relates to improvements in power-transmitting devices; and it has for its objects, first, to conserve and transmit power that has been produced in irregular or intermittent impulses and to transform the same into continuous regular motion; second, to provide an elastic connection between the driver and driven member of a power-transmitting device by means of which the vibration that would otherwise result from a rigid connection is absorbed and its disagreeable and destructive results avoided, and, third, by storing a portion of the power in my transmitting device at the time when the maximum power is applied to the prime mover and by delivering the excessive power to the driven member at a time when the minimum power is applied to the prime mover. The driven member and the contributing elements are thus relieved of the excessive mechanical strain resulting from the impact of force occasioned by the sudden application of power, and a more even motion is effected.

My device possesses properties in some respects similar to a heavy fly-wheel, which when set in operation will by virtue of its momentum produce a regular even motion from very uneven and irregular impulses. The resilient force of a spring in my device takes the place of the fly-wheel or momentum derived for this purpose, energy being absorbed by the spring and held in a state of potential and dynamic energy being afterward given out at the proper time by virtue of the resilience or unwinding of the said spring.

My device is especially adapted to that class of machinery wherein the power of a crank may be converted into continuous rotary motion, such as in sewing-machines, bicycles, and the like.

I have shown the device as it may be applied to a bicycle; but it is evident that it may be just as advantageously applied to other machinery wherein an intermittent power is to be converted into a continuous even rotary motion.

In the accompanying drawings, forming part hereof, Figure 1 is a view showing a portion of a bicycle with my device applied for transmitting the power from the crank to the wheel. Fig. 2 is a section taken on the line 2, looking in the direction of the arrow. Fig. 3 is a longitudinal view of a portion of the tubes $d$ and $d'$, over which the spring is wound, showing the projections $e$ and $e'$ thereon, which projections act as drivers and which will be hereinafter more fully explained. Fig. 4 is a section through line 4, looking in the direction of the arrow.

Like letters refer to corresponding parts throughout the several figures.

$A$ $A'$ $A''$ $A'''$ are portions of an ordinary bicycle-frame. $B$ is the rear bicycle-wheel, upon which is rigidly mounted the bevel-gear $a$. The shaft has bearings carried by the frame in the usual manner.

$b$ and $b'$ are driving-cranks carried by the frame in the usual manner. Rigidly attached to the shaft thereof is the bevel gear-wheel $c$. Surrounding the frame-tube $A'''$ are two sleeves $d$ and $d'$, which are preferably mounted on ball-bearings. These sleeves carry projections or drivers $e$ and $e'$. (See Figs. 3 and 4.) The sleeves $d$ and $d'$ at their outer ends carry two small bevel-gears $f$ and $f'$, respectively, each rigidly attached thereto. An open helical spring $h$, somewhat larger in inside diameter than the sleeve on which it is mounted, is attached at one end to the gear $g$ and at the other end to a collar $k$, which collar is loosely mounted on the sleeve $d'$ and which has ratchet-teeth cut in its face. A pawl $m$ is attached to gear $g$ and is held in contact with ratchet-wheel $k$ by means of spring $n$.

I will now describe the operation of my device when applied to a bicycle.

The tension of the spring $h$ should be adjusted to suit the strength or comfort of the rider. This may be done by turning the ratchet wheel or collar $k$ in the direction of the arrow, Fig. 2, by the application of a suitable wrench or spanner, as will be clearly understood by those skilled in the art. This operation will wind up the spring $h$. The more it is thus wound up the greater will become the tension or pressure between the projections $e$ and $e'$ on the sleeves $d$ and $d'$, to which they are attached. The spring $h$ is directly fastened to the sleeve $d$ and indirectly fastened to $d'$ through the ratchet-wheel $k$, ratchet $m$, and gear $g'$. Therefore the stress caused by the spring between gears $g$ and $g'$ is confined within that limit and while in a static condition does not extend to gears $a$ and $c$. When the cranks and pedals are in the position shown in Fig. 1, when pressure is exerted upon them it will be direct in a line drawn through its axis, and there will not be any power exerted by the cranks at this point; but as the crank progresses in a rotary direction and when they reach a point at practically ninety degrees from the position shown a maximum of power will be transmitted by virtue of the pressure applied to the cranks when in that position. The characteristic curve of power transmitted by a crank with constant pressure on the forward pedal in the manner described may be graphically represented by a sine curve, two of such curves representing a revolution of the crank. There are two impulses, each of maximum and minimum power in each revolution of the crank. The power resulting from the effort at the maximum point of the revolution suddenly accelerates the speed of the bicycle, and the momentum thus attained by the entire mass in motion must be sufficient to continue its bodily motion while the cranks are passing over the points in their revolution where there is no power produced from their operation. Thus it will be seen that the motion of a bicycle consists in a series of jerky irregular impulses. When going against a wind or up a hill, the resistance thereof tends to arrest or retard the effect of the momentum to such an extent that it is sometimes impossible to apply sufficient force at the maximum points in the excursion of the cranks to carry the load over the "dead-points" or points where the minimum force on the cranks is exerted, and therefore the bicycle must come to a stop, whereas the power thus exerted, if conserved and then properly applied, would be sufficient to propel the bicycle against the resistance referred to entirely independent of momentum.

In a bicycle provided with a gear-driver substantially such as that shown in Fig. 1 (without having my intermediate transmitter and conservator) the connection between the crank and the driven wheel is rigid and unyielding, one of the effects of which is to impart a disagreeable vibration from the driven wheel to the pedals and to cause an excessive strain on the gear-teeth and other parts. These effects are due to this positive connection between the crank and the driven wheel. The vibration is not so noticeable in a chain-driven wheel, but the "backlash" of the chain, which is caused by the driven wheel running ahead of the crank and throwing the loose side of the chain on the top side, is equally disagreeable. My device is especially designed to prevent or overcome all of these defects. It accomplishes these results in the following manner: When pressure is applied to the cranks to propel the bicycle, the bevel gear-wheel $c$ transmits the power to bevel-gear $g'$, which is attached to spring $h$, through the medium of pawl $m$ and ratchet-wheel $k$. The power is from thence transmitted through the spiral spring $h$ to bevel gear-wheel $g$, and by it finally to bevel gear-wheel $a$, which being fast to the wheel B gives the latter motion. When the impulse given by the cranks is in excess of that required to drive the wheel during the time while the said impulse is being applied, the excessive power operates to wind up the spring $h$—that is to say, the gear-wheel $g'$ will be turned farther in a revolution at this time than gear-wheel $g$, and the projections $e$ and $e'$ will become separated by the consequent advancement of projection $e'$ beyond projection $e$. The spring will then possess stored power in proportion as the projection $e'$ has advanced ahead of the projection $e$ and directly as to the torque of the spring. Now when the propelling power has decreased in effect, by virtue of the characteristics of the crank as a power-transmitter, as already pointed out, the power thus stored in the spring $h$ will be transmitted to gear-wheel $a$ and will serve to drive the bicycle during the time when the crank is producing but little power. Therefore it will be seen that the power delivered to wheel B is more evenly distributed throughout one cycle of revolution than is possible without my improved device.

When coming down a hill, the wheel B will drive the cranks $b$ and $b'$, through the instrumentality of the projections $e$ and $e'$, independent of the spring $h$.

Having described my invention, what I claim, and desire to secure by Letters Patent, is—

1. In a power-transmitting device the combination of a prime mover, a driven member, and an intermediate transmitter, the latter consisting of a spiral spring mounted upon and attached to two coaxially-arranged sleeves, both of the said sleeves being provided with stops, by which said sleeves are prevented from turning more than one revolution with respect to each other, substantially as described.

2. In a power-transmitting device the combination of a prime mover, a driven member, and an intermediate transmitter, the latter consisting of a spiral spring mounted upon two, coaxially arranged, sleeves, said sleeves free to turn only a part of a revolution with respect to each other, one end of said spring being connected to one of the said sleeves, the other end thereof being connected to a ratchet-collar adapted to turn around the axis of the said sleeve, and a gear-wheel carrying a pawl adapted to engage with the said ratchet-collar, substantially as described.

3. An intermediate power-transmitter, consisting of a spiral spring mounted upon two coaxially-arranged sleeves, each sleeve provided with a stop, said spring connected to one of said sleeves, and a ratchet-toothed pinion, turning on the same axis with the said sleeves, to which the other end of the said spring is adjustably connected, by means of which the adjusted tension of the spring may be permanently maintained, substantially as described.

4. An intermediate power-transmitter consisting of two coaxially-arranged sleeves each provided with a stop, a gear-wheel directly connected to one of the said sleeves, a spring wound around and carried by the said sleeves, being connected at one end to the said gear, and at the other end to a ratchet-toothed wheel, and a gear-wheel on the other sleeve carrying a ratchet-pawl for engaging with said ratchet-wheel, substantially as shown and described.

5. In a power-transmitter the driving-gear $c$ adapted to mesh with the pinion $g'$ a ratchet-pawl $m$ carried by said pinion, two sleeves $d$ and $d'$ carrying the stops $e$ and $e'$, a spring $h$ mounted on the said sleeves, one end of which is connected to one of the sleeves, the other end to ratchet-collar $k$ and a driven gear $a$, substantially as shown and described.

ALBERT WOOLSON FOSTER.

Witnesses:
M. F. ALLEN,
FOREÉ BAIN.